United States Patent [19]
Neumann

[11] Patent Number: 5,973,891
[45] Date of Patent: Oct. 26, 1999

[54] DATA TRANSDUCER AND METHOD FOR WRITING DATA UTILIZING THE BOTTOM POLE AS THE TRAILING EDGE OF A THIN-FILM MAGNETIC TAPE WRITE HEAD

[75] Inventor: Lawrence G. Neumann, Leominster, Mass.

[73] Assignee: Quantum Corporation, Milpitas, Calif.

[21] Appl. No.: 08/861,076

[22] Filed: May 21, 1997

[51] Int. Cl.$^6$ ................................................. G11B 5/147
[52] U.S. Cl. .......................................... 360/126; 360/122
[58] Field of Search ........................... 360/119–123, 125, 360/126; 29/603.01, 603.07, 603.18

[56] References Cited

U.S. PATENT DOCUMENTS

| | | | |
|---|---|---|---|
| 4,819,111 | 4/1989 | Keel et al. | 360/125 |
| 5,465,475 | 11/1995 | Kinoshita et al. | 360/123 |
| 5,530,608 | 6/1996 | Aboaf et al. | 360/113 |
| 5,541,793 | 7/1996 | Schwarz | 360/121 |
| 5,578,342 | 11/1996 | Tran et al. | 427/131 |
| 5,594,608 | 1/1997 | Dee | 360/126 |
| 5,615,069 | 3/1997 | Slade et al. | 360/126 |

OTHER PUBLICATIONS

Quantum Corporation, A Quantum White Paper, "The DLT™ 7000 Tape Drive: A New Level of Performance", http://www.quantum.com/products/whitepapers/dlt/dlt7000.HTM, published on or before May 21, 1997.

Quantum Corporation, Technical Information papers, "DLT™ Tape Drives Meet Critical Needs for Data Backup", http://www.quantum.com . . . itepapers/dltips.html, published on or before May 21, 1997.

IBM Corporation, "The Era of Magnetoresistive Heads", http://www.almaden.ibm.com/storage/oem/tech/eraheads.htm, published on or before May 21, 1997.

Quantum Corporation, A Quantum White Paper, "Magnetoresistive (MR) Head Technology", http://www.quantum.com . . . s/whitepapers/MR–head/, published on or before May 21, 1997.

D. M. Cannon, et al., "Design and Performance of a Magnetic Head for a High–Density Tape Drive", *IBM J. Res. Develop* , vol. 30, No. 3, May 1986.

Seagate, Magnetoresistive Heads Technology Paper, "MR Heads: The Next Step in Capacity and Performance", http://www.seagate.com/support/dis/papers/mr–techp.shtml, Mar. 1997.

Seagate, Technical Fact Sheet, "Magneto–Resistive Heads", htp://www.seagate.com/support/disc/papers/mrheadfs.shtml, Mar. 1997.

Read–Rite Corporation, Technology, "Inside the Read–Rite Head", http://www.readrite.com/aahtml/tech/inrrhead.htm, published on or before May 21, 1997.

Read–Rite Corporation, News Release, Read–Rite Demonstrates Spin Valve Recording Head Technology, http://www.readrite.com/aahtml/nr/spin.htm, published on or before May 21, 1997.

*Primary Examiner*—Jefferson Evans
*Attorney, Agent, or Firm*—William J. Kubida; Robert H. Kelly; Holland & Hart LLP

[57] ABSTRACT

A data transducer, process for fabricating the same and method for writing data to a magnetic storage media, such as magnetic tape, utilizing the bottom (or lower) pole as the trailing edge of a write head. This lower trailing edge pole may be formed of sputtered material such as FeN or FeN-based alloys (which are particularly sensitive to the topography over which they are deposited) since it can be formed on the substantially planar substrate instead of overlying the write coil and its associated insulation layers. Moreover, the bottom pole can be processed using faster and less expensive wet-etching techniques because its width and edge-contours are not critical dimensions which determine recording characteristics. Utilizing the relatively wider and more planar bottom pole as the trailing edge of the write head results in a straighter magnetic transition on the media without the curved edges associated with the fringe fields at the edges of the narrower top pole.

20 Claims, 7 Drawing Sheets

DATA TRANSDUCER AND METHOD FOR WRITING DATA UTILIZING THE BOTTOM POLE AS THE TRAILING EDGE OF A THIN-FILM MAGNETIC TAPE WRITE HEAD

BACKGROUND OF THE INVENTION

The present invention relates, in general, to the field of thin-film data transducers for magnetic storage media. More particularly, the present invention relates to a data transducer and method for writing data to a magnetic storage media, such as DLT computer tape (DLT™ is a trademark of Quantum Corporation, Milpitas, Calif.), utilizing the bottom (or lower) pole as the trailing edge of a write head.

Magnetoresistive ("MR") heads for disk and tape media comprise separate read and write head elements formed over each other and generally sharing certain common material layers. The read element usually consists of an alloy film such as nickel-iron ("NiFe") that exhibits a change in resistance in the presence of a magnetic field. Shielding layers protect the MR elements from other magnetic fields, such as those from the associated write head.

The write head element of an MR transducer is designed much the same way as a thin-film inductive head. It generally comprises two magnetic-pole pieces that are typically made of permalloy, a soft magnetic material. These pole pieces are connected at the ends opposite the media and a deposited-layer copper coil is formed therebetween. When an electrical current is supplied to the coil, it produces a magnetic field across the gap between the two inner ends of the pole pieces at the surface of the head adjacent the media. The magnetic fringe field associated with that gap is used to write data onto a magnetic storage media (disk or tape) by reversing the direction of the magnetic fields on the media surface. The number of turns in the write head coil may be as few as ten or less and the lower inductance this affords over the greater number of turns required in conventional thin-film heads makes it easier to write the signal to the media at very high data frequencies.

DLT technology, as opposed to alternative helical scan technologies, segments a tape media into parallel, horizontal tracks and records data by moving the tape past a stationary head at between 100–300 inches per second during read/write accesses and faster during search operations. This longitudinal recording approach allows for the addition of multiple read and write elements to the head to significantly increase data transfer rates. Current DLT products can read or write two or even four channels simultaneously using multiple read/write elements in the head effectively doubling or quadrupling the transfer rate possible at a given drive speed and recording density. Also, DLT products available from Quantum Corporation, Milpitas, Calif., assignee of the present invention, utilize a linear, serpentine recording approach which allows the drive to read multiple data channels simultaneously. The innovative symmetric phase recording ("SPR") technique also developed by Quantum Corporation enhances conventional DLT recording techniques by writing adjacent tracks with an alternating head angle to eliminate cross-track interference and the need for guard bands making smaller track pitch possible.

Conventionally, thin film heads for both disk and tape media have traditionally had the width of the top pole narrower than the width of the bottom pole in order to assure a straight gap line during fabrication. This results, however, in magnetic field contours which are curved outward around the edges of the narrower top pole. Since writing, or encoding, of data occurs as the media moves past the region of the trailing edge pole, and since disk heads use the substrate as the slider body, (which necessitates that the top pole ("P2") be the trailing edge pole), the written transitions are curved at the track edges. However, since tape heads do not require the substrate to serve as a slider body because there is a cap attached to the write head, the present invention advantageously provides that tape heads be constructed and utilized such that the relatively wider bottom pole forms the trailing edge pole of the write head. This serves to decrease the curved transitions at the track edges.

This use of the bottom pole as the trailing edge pole of the write head is especially helpful in applications utilizing certain advanced materials such as FeN-based alloys that have lower permeability when sputtered on sloped surfaces, such as the ramped ends of the top pole as it passes over the underlying write coil. In addition, this can be helpful in patterning sputtered materials such as CoZrTa, since the magnetic track width can be defined by the top pole and the edges of the bottom pole are not critical dimensions and can be wet-etched without loss of track-width control.

As previously noted, in a conventional thin-film data transducer, the bottom pole is typically wider than the top pole so that the edges of the top pole do not overlap the edges of the bottom pole. While the top pole may be fabricated to be wider than the bottom pole at the media-facing surface through additional complicated processing steps, it cannot be made substantially planar due to the fact that it still must be fabricated overlying the write head coil.

Write operations occur at the trailing edge pole of the write head because the field generated by the head in front of the write gap can change the direction of the magnetization of the media when the media is in front of the gap. Resultantly, there exists a region in front of the gap where the field generated by the head exceeds the coercivity of the media. This is commonly referred to as the "write-bubble". If the direction of the field generated by the head changes, it will change the direction of magnetization of the section of the media that is inside this write-bubble. As the magnetic media moves away from the gap, it is no longer influenced by the field generated there, so the direction of magnetization in the media will remain the same as it is when it leaves the write bubble. Therefore, the shape of the field contour and the field gradient are most critical over the tailing edge pole since that is where the magnetization in the media is set.

SUMMARY OF THE INVENTION

The data transducer and method of the present invention advantageously allows the trailing edge pole to be fabricated on a more planar surface without having to pass over the write head coils. As previously noted, the trailing edge pole is that pole of the write head which the media passes over last in its motion past the write head. The more planar bottom pole provided by the present invention allows for the optimization of the magnetic properties of the pole to be the same everywhere on the pole without variations created by sloping regions.

The data transducer and method of the present invention utilizes the first deposited pole of an inductive thin-film data transducer write head as the trailing edge. The present invention advantageously provides the capability to form the trailing edge pole on a relatively planar, or flat, surface without the topographical excursions otherwise required to form the top pole over the write coil and its associated insulation layers. This allows the use of materials for the trailing edge pole such as iron-nitride (FeN and its alloys, FeTaN, FeAlN etc.) or others which exhibit degraded magnetic properties when sputtered on slanted, or other than planar surfaces. Moreover, the present invention also provides the ability to form the trailing edge pole of sputtered material without the stringent requirements otherwise imposed on patterning of the pole to achieve tight track-width control. This advantageously results in a straighter magnetic transition without the "hooks" at the tracks edges associated with the narrower write pole as the magnetic field spreads from the write gap.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
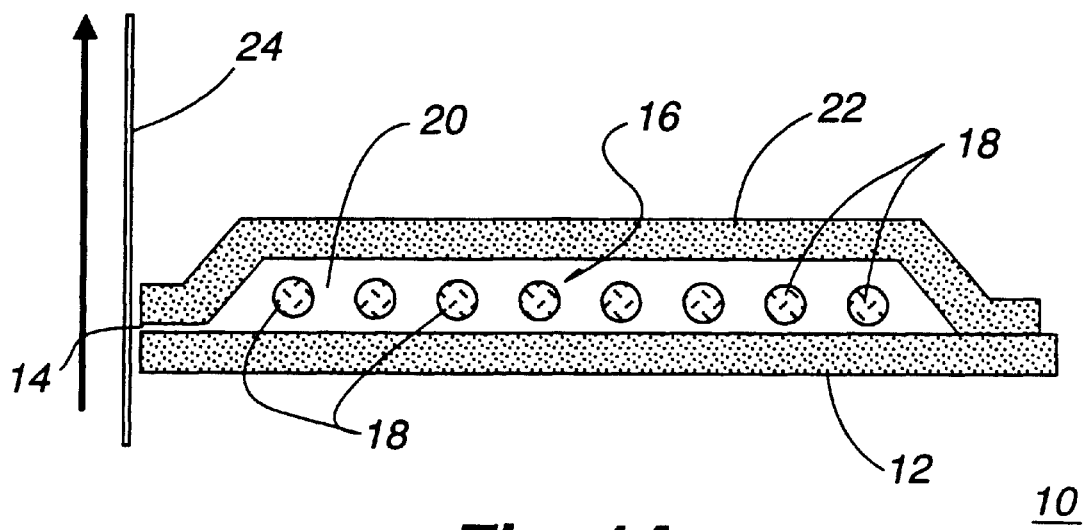
FIG. 1A is a simplified, cross-sectional side elevational view of a write head portion of a data transducer illustrating a relatively planar bottom pole, a number of coil turns and a top pole formed thereover with the direction of the media with respect to the write head being from the bottom to top poles such that the top pole is the "trailing edge" pole as shown in the prior art.
Figure 1B:
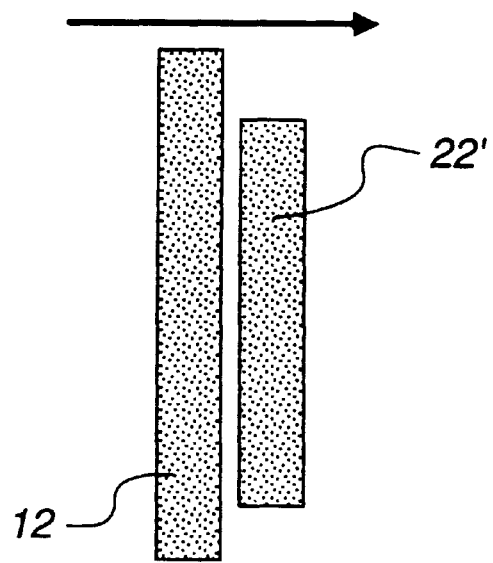
FIG. 1B is a simplified tape view of the configuration of FIG. 1A illustrating a prior art configuration wherein the tape media passes from the relatively planar bottom pole of the write head to the relatively narrower and less planar top pole.

With reference now to FIGS. 1A and 1B, a prior art write head and tape motion configuration 10 is shown. The configuration 10 illustrates a write head which comprises a relatively flat, or planar, leading edge bottom pole 12. A write gap 14 comprising, for example alumina ($Al_2O_3$) is formed over the bottom pole 12. A write coil 16 comprising a number of turns 18 of copper (Cu) is formed between one or more insulation layers 20. In the embodiment of the write head illustrated, there are eight such turns 18 in a single layer although any number may be utilized depending upon the particular application.

A trailing edge top pole 22 is then formed overlying the write gap 14 and write coil 16 and associated insulation layers 20. Due to the presence of the write coil 16 and associated insulation layers 20, the top pole 22 is substantially non-planar. Because of the need to fabricate this pole (22) after the bottom pole 12, and because of variability of alignment of this material with respect to the previously formed layers, this pole (22) is shorter in width at the surface of the head, as shown particularly in FIG. 1B. The write head is positioned adjacent to a movable magnetic storage media, for example tape 24, and writing or encoding of data on the tape 24 occurs in the area of the write gap 14 as it is moved from the bottom pole 12 toward the top pole 22.

Certain sputtered materials are very sensitive to the direction of their deposition. FeN alloys exhibit degraded magnetic properties when sputtered on sloping, or other than substantially planar, or flat, substrates. Moreover, patterning of sputtered pole materials is typically an expensive and time-consuming process when tight dimensional control is required. If the dimensions and the edge-contours are not critical, wet-etching can be used, which is a much cheaper and faster process than alternative processes.

The field contour lines in thin-film heads as shown in configuration 10 exhibit "hooks" at the edges of the narrower trailing edge top pole 22. This leads to curves at the edges of the transitions written on the tape 24 which must be compensated for by decreasing the read width in comparison to the write width of the tracks. If these track edges are read, the curving degrades the quality of the signal (sometimes referred to as "time-smearing" of the read signal). This may be even more problematic in products involving symmetric phase recording, such as certain DLT products where the edge of the written track overlaps a previously written track at an angle and the interaction between the hooks and the previously recorded transition may widen the zone with irregularly magnetized (or "noisy") transitions.

In order to ameliorate some of these problems, the poles of a thin-film head such as that shown in configuration 10 can be "trimmed" to make their widths substantially equal. This then reduces the spread of the magnetic field at the edges of the tracks and increases the usable width of the track for a given track pitch. This is typically accomplished by photo-patterning the wafer with thick photoresist material and ion milling through both poles. The photolithography and ion milling steps result in a long and relatively expensive process. Among the problems encountered are the initial patterning of relatively thick photoresist (it needs to be thick enough to last for the entire milling process through both poles plus the write gap) and the subsequent redeposition of the milled material on the edges of the photoresist. Alernatively, the write poles can be etched on a completed head by a technique such as focused ion bean etching which is another expensive and time-consuming process. Digital Equipment Corporation, Maynard, Mass., developed a "bevel process" as an alternative to on-wafer track trimming which results in the width of the two poles being equal at the gap. However, the re-deposition of the milled material remains problematic in this procedure. Also, while all of these prior approaches serve to reduce the lateral extent of the fringe magnetic fields, they do not eliminate the "hooks" in the field contours which lead to curved transitions at the track edges.

Substantial research has been undertaken to determine how to sputter FeN-based alloys on sloped regions. Bias sputtering and increased processing temperature seem to decrease the inherent problems somewhat, but the permeability on the sloped regions is still at least a factor of three lower than on flat, or substantially planar, substrates. As will be more fully described hereinafter, the present invention allows the sputtering of the material that will be formed into the trailing edge pole on a substantially planar wafer. Moreover, wet-etching techniques can only be used for sputtered pole materials if their dimensions are not critical. The present invention also advantageously increases the tolerances for the sputtered material used for the bottom pole, since the track width is not defined by this dimension.

Figure 2A:
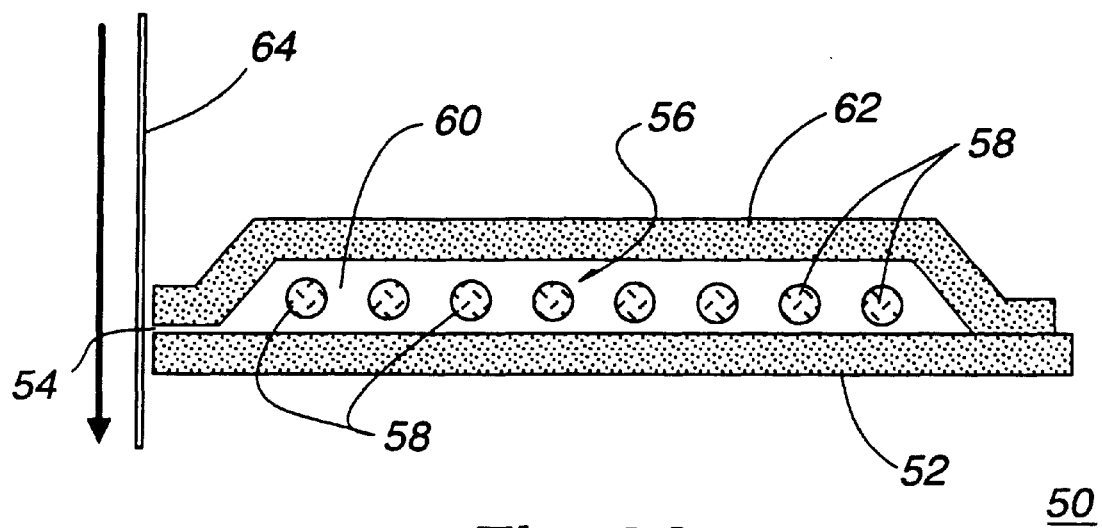
FIG. 2A is a is a simplified, cross-sectional side elevational view of a write head portion of a data transducer in accordance with the present invention illustrating a relatively planar bottom pole, a number of coil turns and a top pole formed thereover with the direction of the media with respect to the write head being from the top to bottom poles such that the bottom pole is the "trailing edge" pole.
Figure 2B:
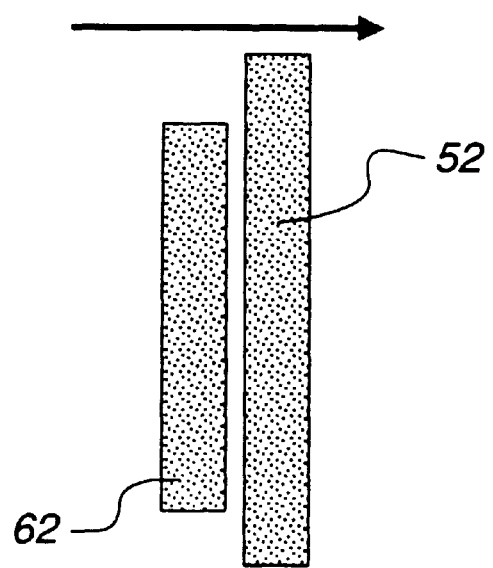
FIG. 2B is a simplified tape view of the configuration of the present invention of FIG. 2A illustrating the tape media passing from the relatively narrower and less planar top pole to the planar bottom pole of the write head.

With reference now to FIGS. 2A and 2B, a write head and tape motion configuration 50 in accordance with the present invention is shown. The configuration 50 illustrates a write head which comprises a relatively flat, or planar, trailing edge bottom pole 52. A write gap 54 comprising, for example alumina ($Al_2O_3$) is formed over the bottom pole 52. A write coil 56 comprising a number of turns 58 of copper (Cu) is formed between one or more insulation layers 60. In the embodiment of the write head illustrated, there are eight such turns 58 in a single layer although ten or any number may be utilized depending upon the particular application.

A leading edge top pole 62 is then formed overlying the write gap 54 and write coil 56 and associated insulation layers 60. As previously described with respect to the prior art configuration 10 of FIGS. 1A and 1B, due to the presence of the write coil 56 and associated insulation layers 60, and because of the variability of alignment of the different layers forming the head, the top pole 62 is substantially non-planar and, as shown particularly in FIG. 2B is shorter in width than the bottom pole 52. The write head is positioned adjacent to a movable magnetic storage media, for example tape 64, and writing or encoding of data on the tape 64 occurs, in distinction to the prior art configuration 10 of the preceding FIGS. 1A and 1B, as it is moved from the top pole 62 toward the bottom pole 52 in the area of the write gap 54.

Figure 3:
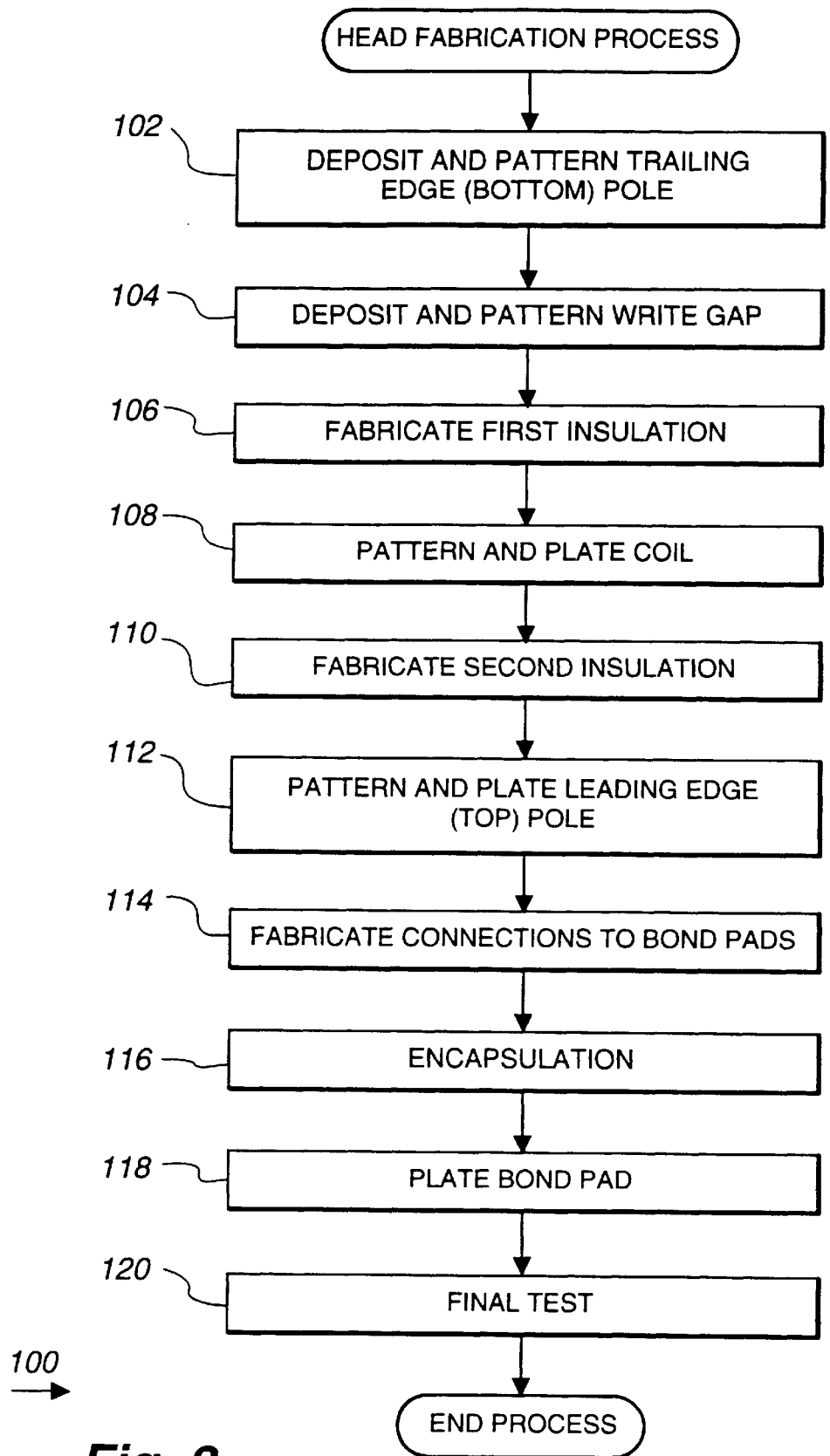
FIG. 3 is a process flow sequence for the fabrication of a tape write head in accordance with the present invention wherein the trailing edge (or bottom) pole is relatively planar by being fabricated prior to the fabrication of the write coil.
Figure 4A:
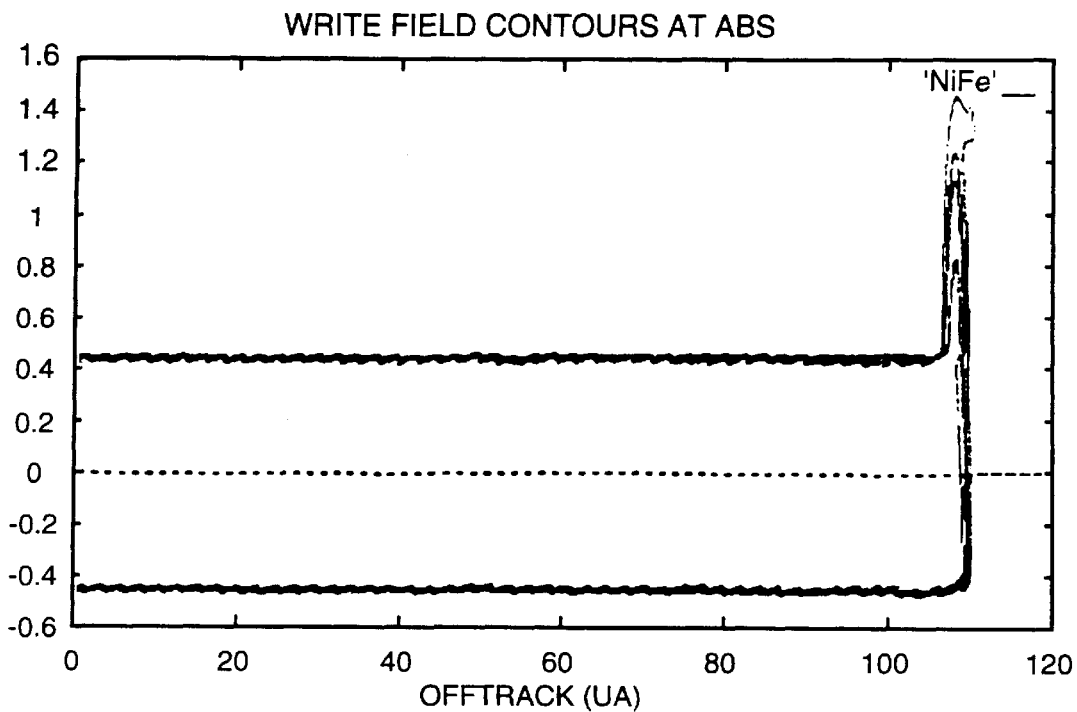
FIGS. 4A and 4B are respective field contour plots for digital linear tape write heads at their air bearing surface ("ABS") for nickel-iron (NiFe) and iron-nitride (FeN) bottom pole ("P1") write heads which have an NiFe top pole ("P2") at 1.0 Hc, 0.75 Hc, 0.67 Hc and 0.5 Hc.
Figure 4B:
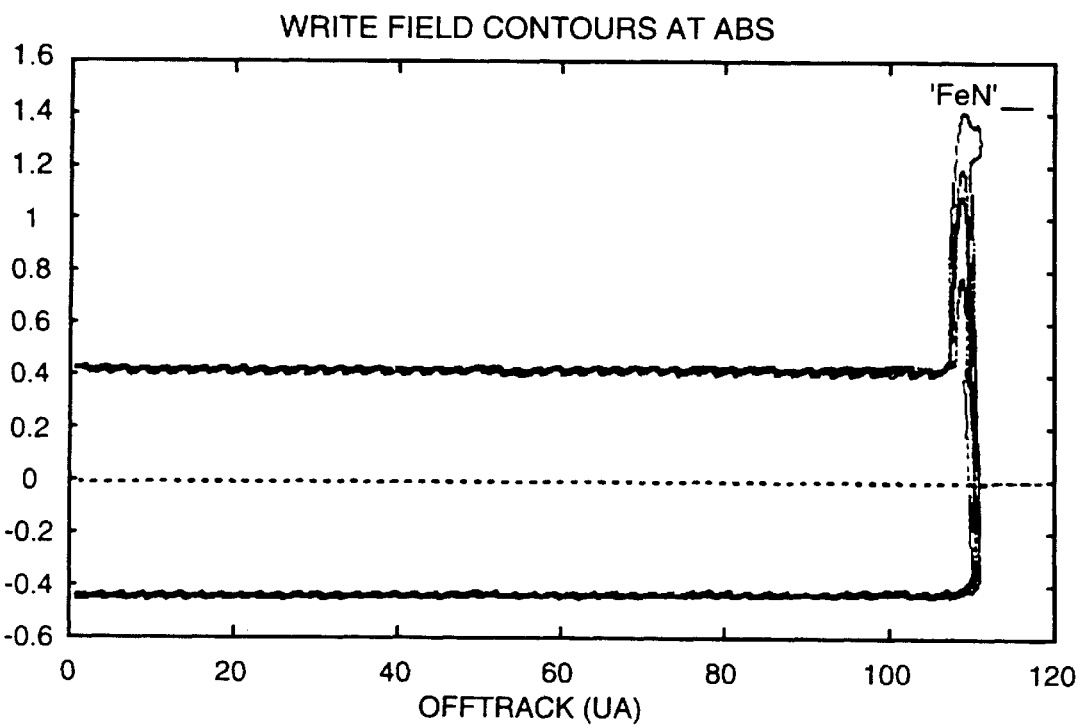

With reference additionally now to FIG. 3, a typical process flow 100 for forming the tape head of the configuration 50 of the present invention is shown. The process flow 100 is similar to that which may be utilized to form a conventional write head with the significant exception that utilizing the bottom pole 52 as the trailing edge pole allows it to be formed of sputtered materials such as FeN in conjunction with a rapid and less expensive wet-etching process.

The process 100 comprises an initial step 102 in which the trailing edge bottom pole 52 is patterned and plated, or in the case of sputtered materials, deposited and patterned. As will be more fully described herein, because the trailing edge pole is the bottom pole, it is formed on a substantially flat, or planar, substrate and may, therefore, be formed of sputtered material such as FeN (and its alloys, for example, FeTaN, FeAlN and the like) which cannot readily be utilized to form the top pole 62. This significant process variation also allows for the use of a wet-etching process in lieu of more time-consuming and expensive processing steps. Thereafter, the write gap 54 is deposited and patterned at step 104. A first one of the insulation layers 60 is then laid down at step 106 and the coil 56 is patterned and plated at step 108. At step 110, a second one of the insulation layers 60 is laid over the coil 56.

The leading edge top pole 62 is then patterned and plated at step 112 followed by the fabrication of connections to the write head bond pads at step 114. At step 116 the write head is encapsulated, the bond pads are plated at step 118 and the write head is sent for final test at step 120.

As previously noted, since tape heads do not require a "slider body" ahead of the transducer the way disk heads do, they can be positioned so that the tape passes over the bottom pole (that is, the first pole deposited on the wafer) last in accordance with the present invention. Further, since the media is recorded as it leaves the place where the field from the head equals its coercivity, the transition in the media will be written adjacent to the wider bottom pole 52 rather than adjacent to the narrower top pole, 62 as is conventionally done in disk heads and in prior art thin-film tape heads.

In detail, the thin-film head is comprised of a transducer which is fabricated on a substrate and a "wear cap" which is bonded to it. The tape passes over this structure in both directions. The present invention specifies that this assembly (the substrate, transducer and wear cap) be positioned so that writing will occur when the tape 64 is moving in the direction from the wear cap to the transducer.

This has special significance and advantage when using sputtered materials for the poles. Iron-nitride based alloys are sensitive to the direction of deposition, with material sputtered on sloping regions of the substrate exhibiting very low permeability. By using the bottom pole as the trailing edge, this pole can be made from high-saturation magnetization ("M") material while maintaining good magnetic properties which provides high head efficiency and fast response. The high M material permits high write fields to be generated with high field gradient unimpaired by saturation at the pole tip edges. Because writing takes place as the tape leaves the head and not as it approaches the gap, this can be effective even with a top pole made from lower M material.

The track width is still defined by the narrower top pole which can be plated through a photoresist frame in a conventional manner thus maintaining good track-width control. The edges of the bottom pole are not critical, neither in their exact location nor in their geometry. This allows the bottom pole material to be etched in a wet chemical bath which is faster and cheaper than dry-etching techniques.

Figure 5A:
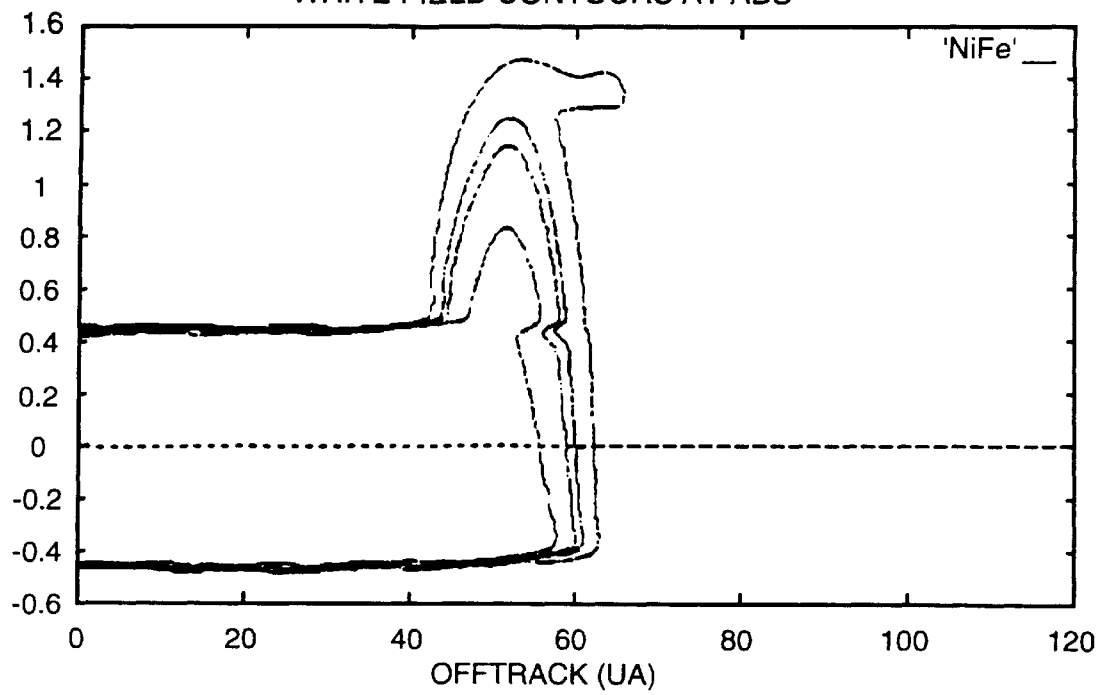
FIGS. 5A and 5B are more detailed views of the track edge region of the contour plots of FIGS. 4A and 4B respectively illustrating in greater detail the way the field contours curve around the top pole of the write head in a conventional configuration which result in a curve in the transition at the edge of the associated tape track.
Figure 5B:
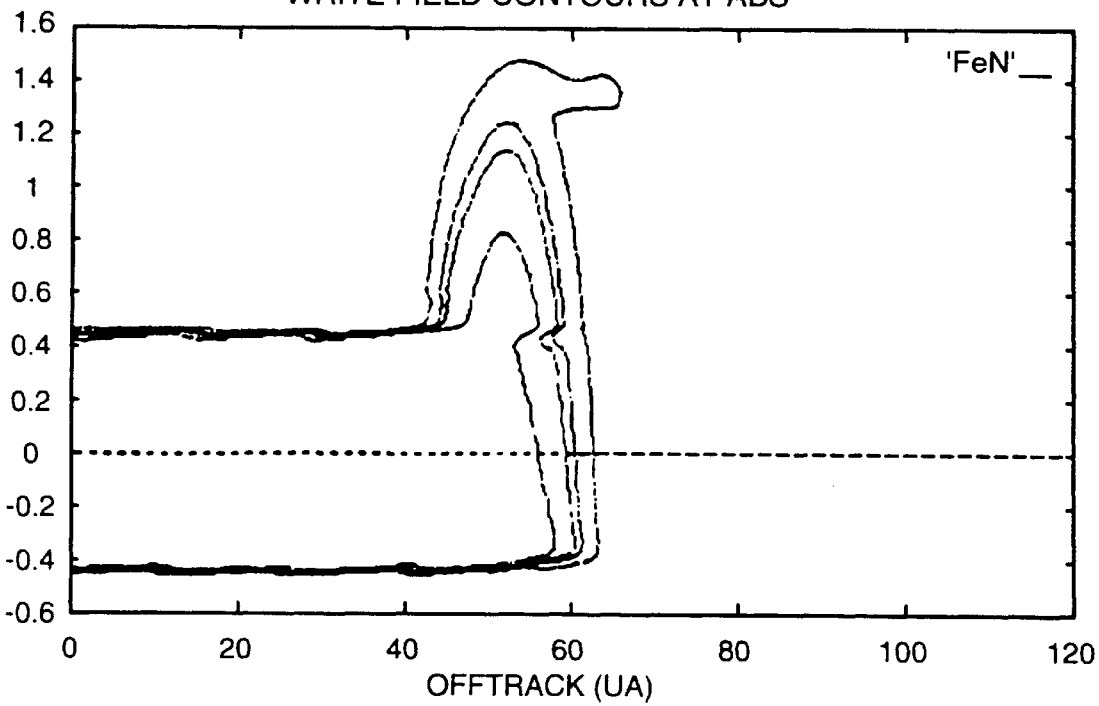

With reference additionally now to FIGS. 4A, 4B and 5A, 5B, contour plots of the magnetic field at the media-facing surface, generated by a write head with a nickel-iron (NiFe) (FIG. 4A) and iron-nitride (FeN) (FIG. 4B) bottom pole ("P1") and with NiFe top poles ("P2") are shown at 1.0 Hc, 0.75 Hc, 0.67 Hc and 0.5 HC. FIGS. 5A and 5B respectively illustrate the undesired curve of the field lines around the top pole in more detail. With reference to these additional figures, it can be seen that the field contours curve around the top pole (at the top of the figure) which results in a curve in the transition at the edge of the track.

Figure 6A:
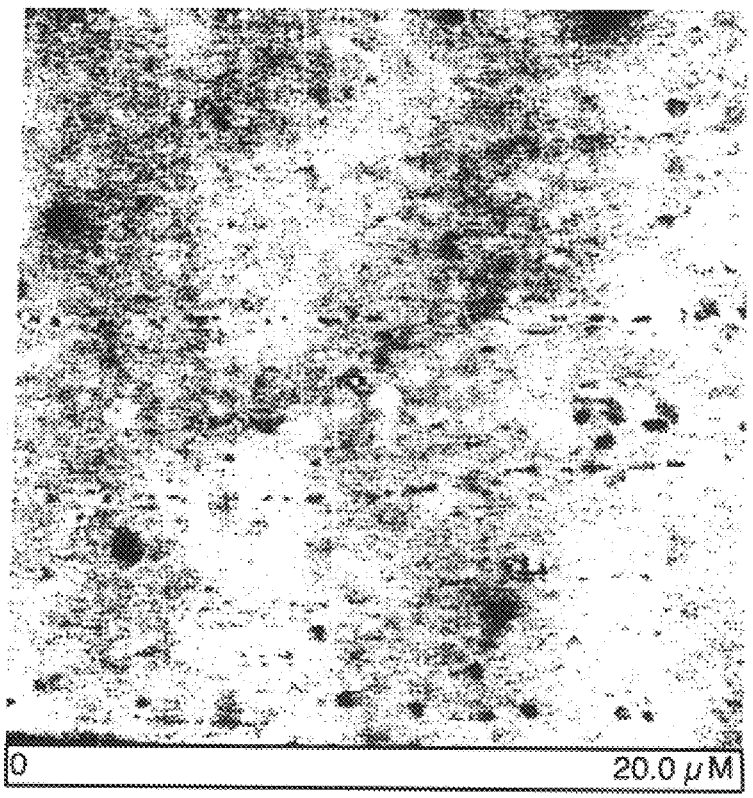
FIGS. 6A and 6B are respective topographic and magnetic force microscopy ("AFM" and "MFM") images of the outer edge of a particular tape track written with the top pole as the trailing edge pole and showing the resultant fringe pattern and the curving of the bits at the transition edge area.
Figure 6B:
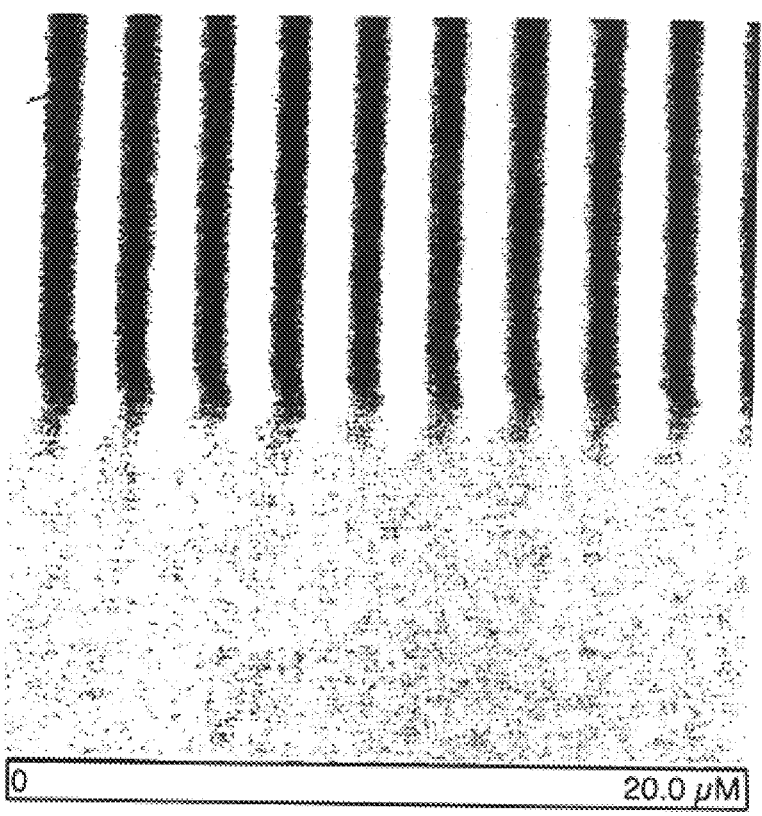

This phenomena has been observed in topographic and magnetic force microscopy ("AFM" and "MFM") images as shown in the succeeding FIGS. 6A and 6B respectively wherein AFM and MFM images of the outer edge of a track (which shall be referred to as track #1) of a tape written with a write head 963X at 24.9Kfpi moving with respect to the head in the direction shown in FIG. 1B. The image was collected on the edge of the written track. FIG. 6B clearly shows the fringe pattern and the curving of the bits at the transition edge area in an image size of 20×20 um.

Figure 7A:
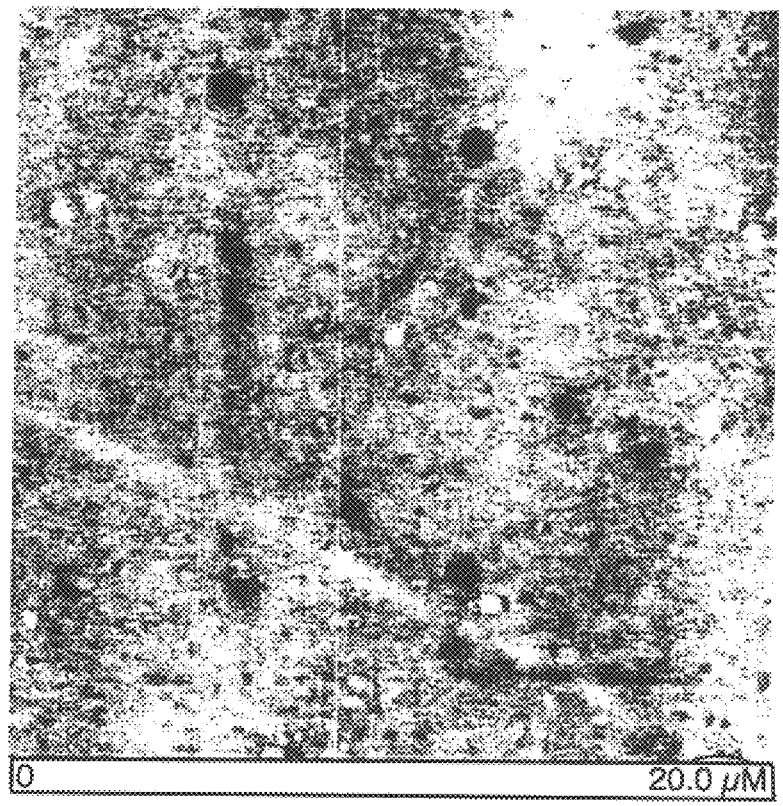
FIGS. 7A and 7B are respective AFM and MFM images of the outer edge of another particular tape track written with the bottom pole as the trailing edge pole and shown a substantially improved fringe pattern and significantly lessened curving of the bits at the corresponding transition edge area.
Figure 7B:
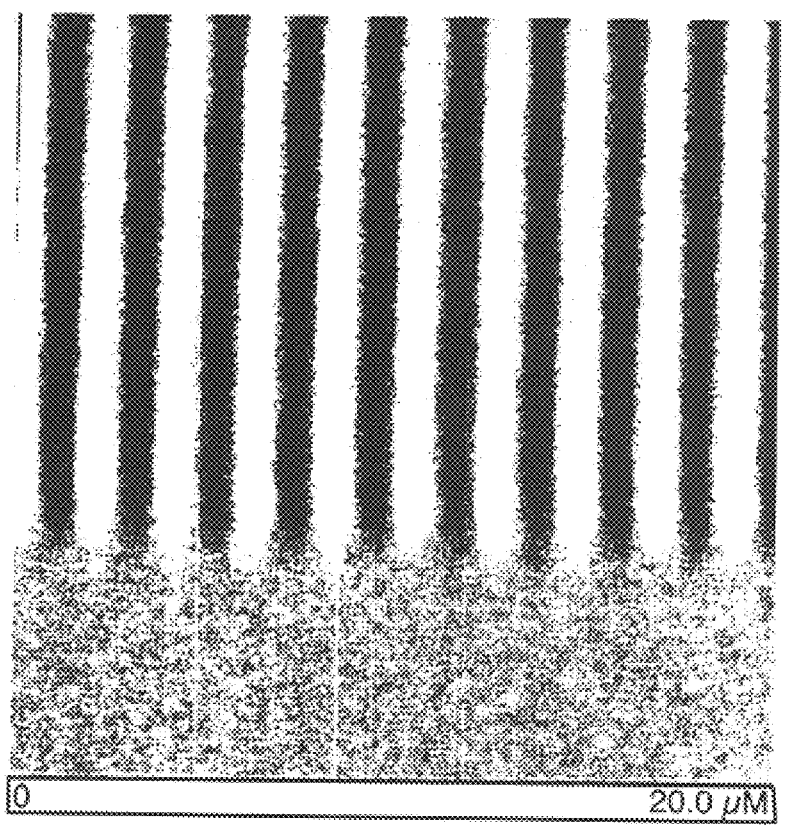

With particular reference to FIGS. 7A and 7B, corresponding views to those detailed in FIGS. 6A and 6B are shown and illustrate AFM and MFM images collected in the edge area of a track written in the direction shown in FIG. 2B at the same 24.9 Kfpi frequency as track #1 shown in the preceding figures. The images were collected on the edge of the written track and also show an image size of 20×20 um. It can be seen that the curved fringe pattern is less obvious in FIG. 7B than that of FIG. 6B written in the opposite direction with respect to the head on track #1.

When the tape passes over the bottom pole last (moving top to bottom in FIGS. 2A as well as FIG. 4 and FIG. 5), the field contour where the writing takes place is straight, without a hook curving backward along the tape and the MFM images of tracks written in this direction are straight without a curved region at the edge.

While there have been described above the principles of the present invention in conjunction with specific data transducer configurations and storage media applications, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A data storage device comprising:
   a moving magnetic storage medium having at least one data track thereon for encoding a plurality of data bits at a like plurality of positions therealong; and
   a data transducer positioned adjacent said at least one data track of said storage medium, said data transducer including a write head having a first pole thereof of a first width and a second pole thereof of a second width greater than said first width, said first pole formed of a first material exhibiting a first magnetization and said second pole formed of a second material exhibiting a second magnetization and formed utilizing a wet-chemical-bath etching technique, the second magnetization greater than the first magnetization, said storage medium being moved relative to said write head such that said plurality of data bits are encoded as said plurality of positions pass from said first pole to said second pole.

2. The data storage device of claim 1 wherein said moving magnetic storage medium comprises a magnetic tape.

3. The data storage device of claim 1 wherein said second pole is said bottom pole of said write head.

4. The data storage device of claim 1 wherein said second pole of said write head is substantially planar.

5. The data storage device of claim 1 wherein said second pole is formed of a sputtered material.

6. The data storage device of claim 1 wherein said sputtered material comprises FeN or its alloys.

7. The data storage device of claim 1 wherein said second width is defined by wet-etching with the wet-chemical-bath etching technique of said second pole.

8. The data storage device of claim 1 further comprising a gap layer interposed between said first and second poles of said write head adjacent said storage medium.

9. The data storage device of claim 1 further comprising a write coil interposed between said first and second poles of said write head.

10. A method for encoding a plurality of data bits on a magnetic storage medium comprising the steps of:
    providing a data transducer including a write head having a first pole thereof of a first width and a second pole thereof of a second width greater than said first width said first pole formed of a first material exhibiting a first magnetization and said second pole formed of a second material exhibiting a second magnetization and formed utilizing a wet-chemical-bath etching technique, the second magnetization greater than the first magnetization; and
    moving said magnetic storage medium relative to said write head such that said data bits are encoded as said storage medium moves from said first pole to said second pole.

11. The method of claim 10 wherein said step of providing comprises the steps of:
    establishing said second pole of said write head;
    overlying a gap layer on at least a portion of said second pole adjacent said magnetic storage medium;
    establishing a coil overlying and insulated from said second pole;
    overlying said coil with said first pole of said write head insulated from said coil.

12. The method of claim 11 wherein said step of establishing said second pole comprises the step of:
    sputtering a magnetic material on a substantially planar substrate.

13. The method of claim 12 wherein said step of sputtering is carried out by FeN or its alloys.

14. The method of claim 12 wherein said step of establishing further comprises the step of:
    wet-etching with the wet-chemical-bath etching technique of said second pole to establish said second width.

15. A process for forming a magnetic write head comprising the steps of:
    forming a trailing edge pole of said write head utilizing a wet-chemical-bath etching technique, the trailing edge pole exhibiting a trailing-edge-pole magnetization;
    forming a gap layer overlying said trailing edge pole;
    forming a first insulating layer overlying said gap layer;
    forming a coil overlying said first insulating layer;
    forming a second insulating layer overlying said coil;
    forming a leading edge pole, which exhibits a leading-edge-pole magnetization, of said write head, the trailing-edge-pole magnetization greater than the leading-edge-pole magnetization; and
    forming electrical connections to said coil, a magnetic storage medium moveable relative to the leading edge pole and the trailing edge pole such that a magnetic storage medium passes from the leading edge pole to the trailing edge pole.

16. The process of claim 15 wherein said step of forming said trailing edge pole further comprises the step of:

sputtering a magnetic material on a substantially planar substrate.

17. The process of claim 16 wherein said step of sputtering is carried out by depositing FeN or an FeN-based alloy.

18. The process of claim 15 wherein said step of forming said trailing edge pole further comprises the step of:

wet-etching, utilizing the wet-chemical-bath etching technique, said trailing edge pole to establish a width of said trailing edge pole greater than that of said leading edge pole.

19. The process of claim 15 wherein said step of forming a gap layer comprises the step of:

depositing alumina on a portion of said trailing edge pole.

20. The process of claim 15 wherein said step of forming a coil comprises the step of:

depositing copper onto said first insulating layer.

* * * * *